(12) United States Patent
Matsunaga et al.

(10) Patent No.: US 11,930,401 B2
(45) Date of Patent: Mar. 12, 2024

(54) CONTROL DEVICE, CONTROL METHOD, AND COMPUTER-READABLE STORAGE MEDIUM

(71) Applicant: HONDA MOTOR CO., LTD., Tokyo (JP)

(72) Inventors: Hideki Matsunaga, Wako (JP); Satoshi Onodera, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 151 days.

(21) Appl. No.: 17/485,408

(22) Filed: Sep. 25, 2021

(65) Prior Publication Data

US 2022/0014969 A1  Jan. 13, 2022

Related U.S. Application Data

(63) Continuation of application No. PCT/JP2019/014299, filed on Mar. 29, 2019.

(51) Int. Cl.
*H04W 28/08* (2023.01)
*G05D 1/00* (2006.01)
*H04W 4/44* (2018.01)
*H04W 40/22* (2009.01)
*H04W 88/08* (2009.01)

(52) U.S. Cl.
CPC ...... *H04W 28/0967* (2020.05); *G05D 1/0022* (2013.01); *H04W 4/44* (2018.02); *H04W 40/22* (2013.01); *H04W 88/085* (2013.01)

(58) Field of Classification Search
CPC ..... H04W 28/967; H04W 4/44; H04W 88/08; H04W 88/085; H04W 84/005
See application file for complete search history.

(56) References Cited

U.S. PATENT DOCUMENTS

| 10,721,709 B2 | 7/2020 | Zhao et al. |
| 10,856,335 B2 | 12/2020 | Uchiyama et al. |
| 2005/0255807 A1 | 11/2005 | Araki et al. |
| 2010/0291931 A1 | 11/2010 | Suemitsu et al. |
| 2011/0092237 A1 | 4/2011 | Kato et al. |
| 2012/0028627 A1* | 2/2012 | Hunzinger ...... H04W 36/00837 455/422.1 |

(Continued)

FOREIGN PATENT DOCUMENTS

| CN | 1698292 A | 11/2005 |
| CN | 101843143 A | 9/2010 |

(Continued)

OTHER PUBLICATIONS

International Search Report and Written Opinion for PCT/JP2019/014299 dated Jun. 11, 2019.

(Continued)

*Primary Examiner* — Robert C Scheibel
(74) *Attorney, Agent, or Firm* — Thomas| Horstemeyer, LLP (57) ABSTRACT

A control device acquires information regarding a communication quality of a base station that performs a predetermined type of communication, and performs a control for moving a mobile base station to a position associated with the base station in a case where it is determined that the communication quality is lower than a predetermined communication quality.

11 Claims, 4 Drawing Sheets

(56) References Cited

U.S. PATENT DOCUMENTS

| | | | |
|---|---|---|---|
| 2015/0017999 A1* | 1/2015 | Chen | H04W 16/14 |
| | | | 455/452.1 |
| 2016/0309506 A1* | 10/2016 | Lim | H04W 74/006 |
| 2016/0363457 A1* | 12/2016 | Jelavic | G01C 21/3461 |
| 2019/0059115 A1* | 2/2019 | Uchiyama | H04W 72/0453 |
| 2019/0200319 A1 | 6/2019 | Zhao et al. | |
| 2022/0167248 A1* | 5/2022 | Yanai | H04W 28/08 |
| 2022/0394613 A1* | 12/2022 | Kwon | H04W 72/51 |

FOREIGN PATENT DOCUMENTS

| | | |
|---|---|---|
| CN | 102090134 A | 6/2011 |
| CN | 107547164 A | 1/2018 |
| JP | 2012-151726 A | 8/2012 |
| JP | 2017-216663 A | 12/2017 |
| WO | 2017/169111 A1 | 10/2017 |
| WO | 2020/202370 A1 | 10/2020 |

OTHER PUBLICATIONS

Chinese Office Action for Chinese Patent Application No. 201980094174.X dated Apr. 29, 2023.

Chinese Office Action for Chinese Patent Application No. 201980094174.X dated Nov. 1, 2023.

* cited by examiner

CONTROL DEVICE, CONTROL METHOD, AND COMPUTER-READABLE STORAGE MEDIUM

CROSS-REFERENCE TO RELATED APPLICATION(S)

This application is a continuation of International Patent Application No. PCT/JP2019/014299 filed on Mar. 29, 2019, the entire disclosures of which is incorporated herein by reference.

BACKGROUND OF THE INVENTION

Field of the Invention

The present invention relates to a technology for improving a communication quality of wireless communication.

Description of the Related Art

A remote driving technology in which a vehicle is moved by being operated by an operator present at a remote place is known. In the remote driving, sufficient suppression of a delay in communication between an operator device operated by an operator who performs the remote driving and a terminal device mounted on the vehicle is one of required communication qualities (see PTL 1).

CITATION LIST

Patent Literature

PTL 1: Japanese Patent Laid-Open No. 2017-216663

For a control using predetermined wireless communication such as remote driving or automated driving, it is important to stably provide high-quality wireless communication services. For this reason, as many facilities such as base stations are constructed, for example, efforts to improve a communication quality of a wireless communication service have been continued. However, a huge capital investment is required to always provide a stable wireless communication service, but such a capital investment is not realistic.

SUMMARY OF THE INVENTION

The present invention provides a technology for efficiently improving a communication quality in an area where the communication quality is insufficient.

A control device according to an aspect of the present invention includes: an acquisition unit configured to acquire information regarding a communication quality of a base station that performs a predetermined type of communication; and a control unit configured to perform a control for moving a mobile base station to a position associated with the base station in a case where it is determined that the communication quality is lower than a predetermined communication quality.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<Configuration of System>

Figure 1:
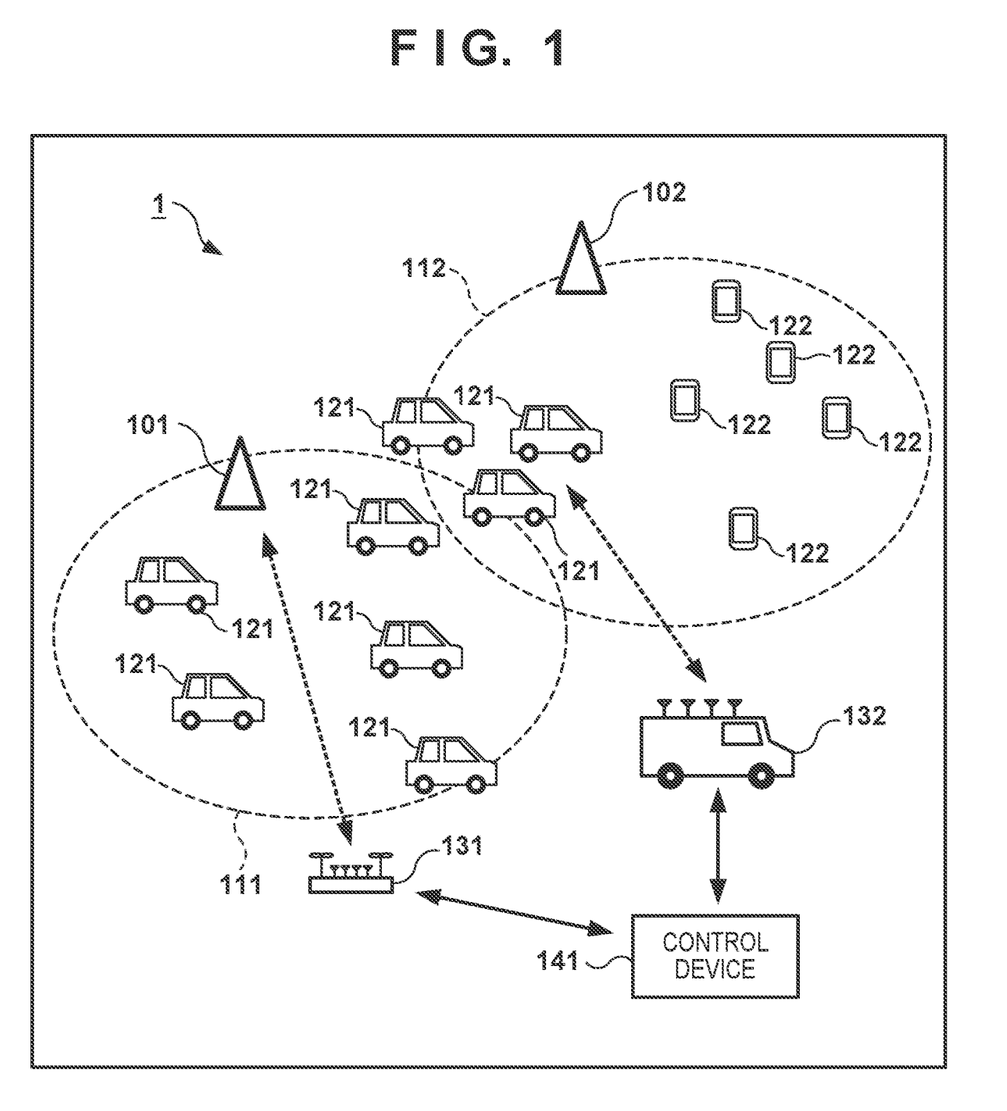
FIG. 1 is a diagram illustrating an example of a configuration of a system.

FIG. 1 illustrates an example of a configuration of a control system 1 according to the present embodiment. The control system 1 may be a system used for improving communication quality in a wireless communication system in which a communicable area is developed such as cellular wireless communication. Note that FIG. 1 illustrates an example on the premise of a cellular communication system, but a wireless LAN or another wireless communication system may be used. Note that the communication quality to be improved here can be represented by indices such as signal-to-noise ratio (SNR), signal-to-interference-plus-noise ratio (SINR), reference signal received power (RSRP), reference signal received quality (RSRQ), and received signal strength. The communication quality is evaluated to be improved when the value thereof is increased. Furthermore, the communication quality may be, for example, a delay in communication between a terminal device and a communication partner device connected via a base station or a network, and in this case, it can be evaluated that the communication quality is improved when the delay in communication is shortened. Furthermore, the communication quality may be the degree of congestion of a base station, the use rate of a wireless resource, or the like. In this case, it is evaluated that the communication quality is improved when the congestion is resolved or the use rate of the wireless resource is decreased. Furthermore, a communication quality other than these may be a target of improvement.

The cellular communication system is configured so that each of one or more base stations (for example, a base station 101 and a base station 102) provides a wireless communication service to a terminal device with a range of a cell (for example, a cell 111 and a cell 112) formed by each base station as a communicable range. The terminal device includes, for example, an in-vehicle terminal device 121 mounted on a remote driving vehicle or an automated driving vehicle, and the terminal device 121 is configured to perform a predetermined type of communication for remote driving or automated driving, for example. Note that the terminal device 121 can generally perform communication other than the predetermined type of communication, but in this example, all terminal devices indicated as the terminal device 121 perform the predetermined type of communication. In addition, the terminal device can include, for example, a handheld type terminal device 122 such as a smartphone. It is assumed that the terminal device 122 performs, for example, communication different from the predetermined type of communication as described above. Note that these terminal devices are merely examples, and the terminal device may be, for example, a portable terminal device such as a tablet or a notebook PC, a fixed terminal device, or the like.

As described above, each base station can provide a wireless communication service to a terminal device within a range of a cell formed by the base station itself. It is highly likely that the base station can perform high-quality wireless communication with a terminal device staying within a line of sight from a position where the base station is installed or a terminal device positioned near the base station. On the other hand, wireless communication between the base station and the terminal device that stays at the cell edge or in the shadow of a building is not unlikely to make it difficult to perform high-quality wireless communication. In addition, even in a case where a cell is designed so that high-quality wireless communication can be performed in the entire cell formed by the base station, for example, when the number of terminal devices connected to one base station increases, the amount of communication resources (for example, a frequency/time resource, a spatial resource, or an operation resource) available to the terminal devices decreases, and the communication quality may be relatively deteriorated.

In the present embodiment, a mobile base station (for example, an automatic flight vehicle type mobile base station 131 and a vehicle-type mobile base station 132) is used to solve such a situation where the communication quality is insufficient. That is, in a case where there is an area where the communication quality is insufficient, the mobile base station is moved to a position where the wireless communication service in the area can be provided, such that the high-quality wireless communication service is provided by the mobile base station. By using such a mobile base station, it is possible to improve the communication quality in an area where the quality of communication of a fixed base station is insufficient. At this time, since the number of mobile base stations is limited, it is important to arrange the mobile base station at an appropriate position at an appropriate timing. In the present embodiment, a control device 141 is prepared to control such arrangement of the mobile base station.

In an example, the control device 141 performs a control for moving the mobile base station to an area where the communication quality is low. As a result, the communication quality in the area can be improved. However, among the terminal devices, there can be a terminal device that performs a predetermined type of communication that requires a high communication quality such as communication for remote driving or automated driving, and a terminal device that performs another type of communication that only requires a relatively low communication quality. At this time, it cannot be said that the effect of improving the communication quality of the entire system is sufficiently obtained by moving the mobile base station so as to provide the wireless communication service in an area where only the terminal device that performs the type of communication that may have a low communication quality is present.

Therefore, the control device 141 of the present embodiment acquires information regarding the communication quality of the base station that performs the predetermined type of communication, and performs a control for moving the mobile base station to a position associated with the base station in a case where it is determined that the communication quality is lower than a predetermined communication quality based on the information. For example, in FIG. 1, the terminal device 121 that performs the predetermined type of communication for automated driving, remote driving, or the like is present in the cell 111 formed by the base station 101. Therefore, the control device 141 acquires information regarding a communication quality of the base station 101. Then, in a case where it is determined that the communication quality is lower than the predetermined communication quality, the control device 141 moves the mobile base station (for example, the mobile base station 131) to a position associated with the base station 101.

In addition, the terminal device 121 that performs the predetermined type of communication for automated driving, remote driving, or the like is also present in the cell 112 formed by the base station 102. Therefore, the control device 141 acquires information regarding a communication quality of the base station 102, and moves the mobile base station (for example, the mobile base station 132) to a position associated with the base station 102 in a case where it is determined that the communication quality is lower than the predetermined communication quality. Note that the terminal device 122 that performs another type of communication different from the predetermined type of communication is also present in the cell 112. At this time, in a case where the communication quality of the predetermined type of communication performed by the terminal device 122 is not lower than the predetermined communication quality, the control device 141 does not move the mobile base station to the position associated with the base station 102 even in a case where it is determined that the communication quality of the another type of communication is lower than the predetermined communication quality.

As a result, in a case where the communication quality of the predetermined type of communication is sufficient in a cell formed by a certain base station, the mobile base station is not moved to a position associated with the base station, such that the mobile base station can be used for improving the communication quality in other areas. On the other hand, in a case where the communication quality of the predetermined type of communication is not sufficient in a cell formed by a certain base station, the communication quality related to the predetermined type of communication can be improved by moving the mobile base station to a position associated with the base station.

Note that the position associated with the base station is, in an example, a position where the base station is arranged. That is, by arranging the mobile base station at substantially the same position as the base station, the communication capability of the base station can be boosted in a pseudo manner. Meanwhile, for example, in FIG. 1, the terminal devices 121 are maldistributed in a partial area in the cell 112. In this case, the mobile base station can perform a control to move the mobile base station (for example, the mobile base station 132) to a position where the wireless communication service can be provided in at least a part of the area where the terminal device 121 is maldistributed. That is, the position associated with the base station may be a position at which the base station is installed or a position away from the base station as long as it is a position at which the area can be formed in at least a part of the range of the cell formed by the base station.

Note that the control device 141 may determine whether or not the communication quality of the predetermined type of communication is lower than the predetermined communication quality, or may acquire a determination result from other device. For example, the control device 141 can acquire, from each base station, information indicating the actually measured communication quality of the predetermined type of communication of the base station. Here, the information indicating the actually measured communication quality can be, for example, information in an arbitrary format such as the lowest value, the average value, the variance, or the distribution of the actually measured communication quality. The control device 141 may acquire information indicating the communication quality of another type of communication. In this case, the control device 141 can acquire, for example, information indicating the communication quality and information indicating the type of communication corresponding to the communication quality. In this case, the control device 141 can determine whether or not the communication quality of the predetermined type of communication is lower than the predetermined communication quality by comparing the acquired value of the communication quality of the predetermined type of communication with the predetermined communication quality. Furthermore, the information indicating the communication quality may be the number of terminal devices that perform the predetermined type of communication. Here, in a case where the number of terminal devices that perform the predetermined type of communication exceeds a predetermined number, the control device 141 may determine that the communication quality of the predetermined type of communication is lower than the predetermined communication quality. This is because it is assumed that as the number of terminal devices increases, the number of communication resources allocated to each terminal device decreases, which results in deterioration of the communication quality.

Furthermore, the control device 141 may acquire information capable of specifying a correspondence relationship between the position of the terminal device that performs the predetermined type of communication and the communication quality. Then, in a case where an area where the communication quality of the predetermined type of communication of a certain base station is predicted to be lower than the predetermined communication quality is included in a cell formed by the base station, the control device 141 may determine that the communication quality of the predetermined type of communication is lower than the predetermined communication quality. For example, the control device 141 can acquire information indicating a geographical distribution of positions of the terminal devices that perform the predetermined type of communication, and in a case where the terminal devices are maldistributed in a partial area (for example, in a case where the density of the terminal devices exceeds a predetermined value), the control device 141 can determine that the communication quality of the predetermined type of communication is lower than the predetermined communication quality in the area. In addition, the base station can form a plurality of beams to perform communication, but in a case where the usage of the frequency/time resources for the predetermined type of communication using some beams exceeds a predetermined value, it can be determined that there is an area where the communication quality of the predetermined type of communication is lower than the predetermined communication quality. Note that the control device 141 can specify an area where the communication quality is lower than the predetermined communication quality at the time of this determination. As a result, as described above, it is possible to perform a control to move the mobile base station to a position where the wireless communication service can be provided for at least a part of an area where the terminal devices that perform the predetermined type of communication are maldistributed.

Note that each base station may perform such determination, and the control device 141 may acquire the determination result. Furthermore, the control device 141 may acquire the information indicating the communication quality and the information of the determination result as described above from a network node that intensively manages these pieces of information. That is, the control device 141 may acquire the information from a device other than the base station.

As an example of the control for moving the mobile base station, the control device 141 can perform a control for outputting information indicating a position to which the mobile base station is to be moved, and providing the information to a network operator or the like who operates the mobile base station. In addition, the control device 141 can perform a control to set, as a destination, the position to which the mobile base station is to be moved inside the mobile base station. The mobile base station can be an automatic flight vehicle capable of automatically moving such as a drone, an automated driving vehicle, or a remote driving vehicle. In this case, by performing the control for setting the destination in the mobile base station, the mobile base station can be automatically moved to a position associated with the base station that performs the predetermined type of communication with an insufficient communication quality. Note that the destination can be determined according to the characteristics of the mobile base station. That is, in a case where the mobile base station is a vehicle having a base station function such as an automated driving vehicle, it is necessary to designate a position on a road or a position available for parking as the destination. In the present embodiment, in a case where the mobile base station is a vehicle, a movement route is on a road. However, the mobile base station may not remain at any location on the road and be operated as a base station. For this reason, even in a case where the position where the mobile base station can provide the wireless communication service is on the movement route, it is determined whether or not the mobile base station is allowed to stay on the road, and in a case where the mobile base station cannot stay on the road, it is necessary to designate a nearby available parking lot or the like as the destination. In addition, in a case where the wireless communication service is to be provided at a position within a range of a predetermined distance from the movement route, it is necessary to designate a road in the vicinity of the position on which the mobile base station can stay, a parking lot, or the like as the destination. In addition, in a case where the mobile base station is a flight vehicle having the base station function such as an automatic flight vehicle, it is not necessary to concern about a road or a position where parking is possible, but it is necessary to designate the latitude, longitude, and height to stay in the air in consideration of the height of a building or the like. In particular, in a case where the position is on the movement route, the mobile base station can be moved along the movement route. However, in a case where the mobile base station is to be moved to a position away from the movement route within a range of a predetermined distance, it is necessary to consider the influence of surrounding buildings and the like in the designation of the position. Therefore, the control device 141 determines and sets the destination suitable for the characteristics of the mobile base station.

Note that the above-described predetermined type of communication includes, for example, communication for controlling remote driving or automated driving of the vehicle. With this configuration, for an area where the communication quality of the communication for controlling remote driving and automated driving of the vehicle is insufficient, it is possible to improve the communication quality using the mobile base station and to perform a stable control of the remote driving and the automated driving. Furthermore, the above-described predetermined type of communication may include communication of a next-generation in-vehicle infotainment system. With this configuration, by improving the communication quality using the mobile base station for the area where the communication quality of the communication is insufficient, a communication service provided by the infotainment system in the vehicle can be used in a highly functional and highly accurate state. Note that other communication may be handled as the above-described predetermined type of communication.

Hereinafter, a configuration and operation of the control device that executes such processing will be described.

(Configuration of Device)

Figure 2:
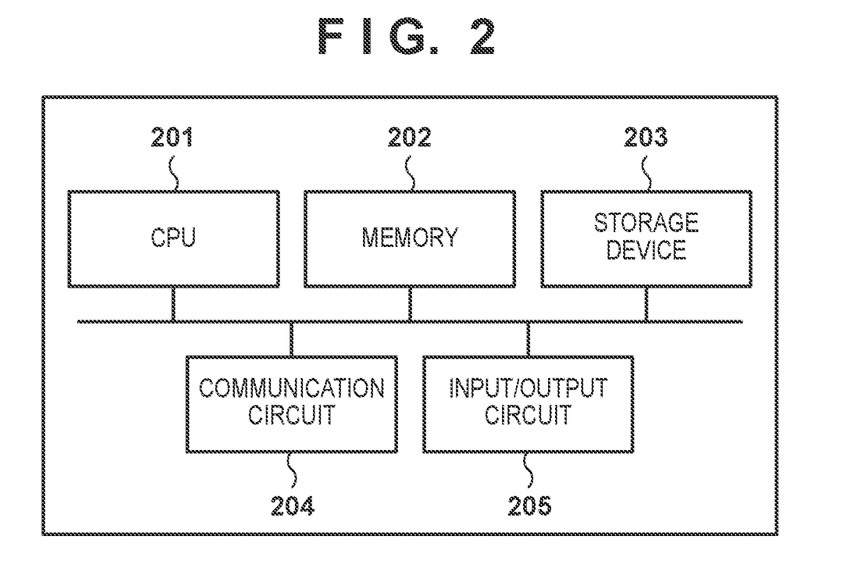
FIG. 2 is a diagram illustrating an example of a hardware configuration of a control device.

FIG. 2 is a diagram illustrating an example of a hardware configuration of the control device 141 of the present embodiment. The control device 141 is a general-purpose computer in an example, and includes, for example, a CPU 201, a memory 202, a storage device 203, a communication circuit 204, and an input/output circuit 205. The CPU 201 executes, for example, a program stored in the memory 202 to execute processing to be described later and perform a control of the entire device. Note that the CPU 201 can be substituted by any one or more processors such as a microprocessor unit (MPU) and an application-specific integrated chip (ASIC). The memory 202 holds a program for causing the control device 141 to execute various processing and functions as a work memory at the time of executing the program. In an example, the memory 202 is a random access memory (RAM) or a read-only memory (ROM). The storage device 203 is, for example, a detachable external storage device, a built-in hard disk drive, or the like, and holds various types of information. The communication circuit 204 executes signal processing related to communication, acquires various types of information from an external device through a communication network, and transmits various types of information to the external device. Note that the information acquired by the communication circuit 204 can be stored in, for example, the memory 202 or the storage device 203. Note that the control device 141 can include a plurality of communication circuits 204. The input/output circuit 205 controls, for example, output of screen information to be displayed on a display device (not illustrated) or sound information to be output from a speaker, and reception of an input from a user via a keyboard, a pointing device, or the like. Note that the input/output circuit 205 may control a device that integrally performs input/output such as a touch panel. Note that the configuration of FIG. 2 is an example, and for example, the control device 141 may be configured by dedicated hardware for executing the above-described processing.

Figure 3:
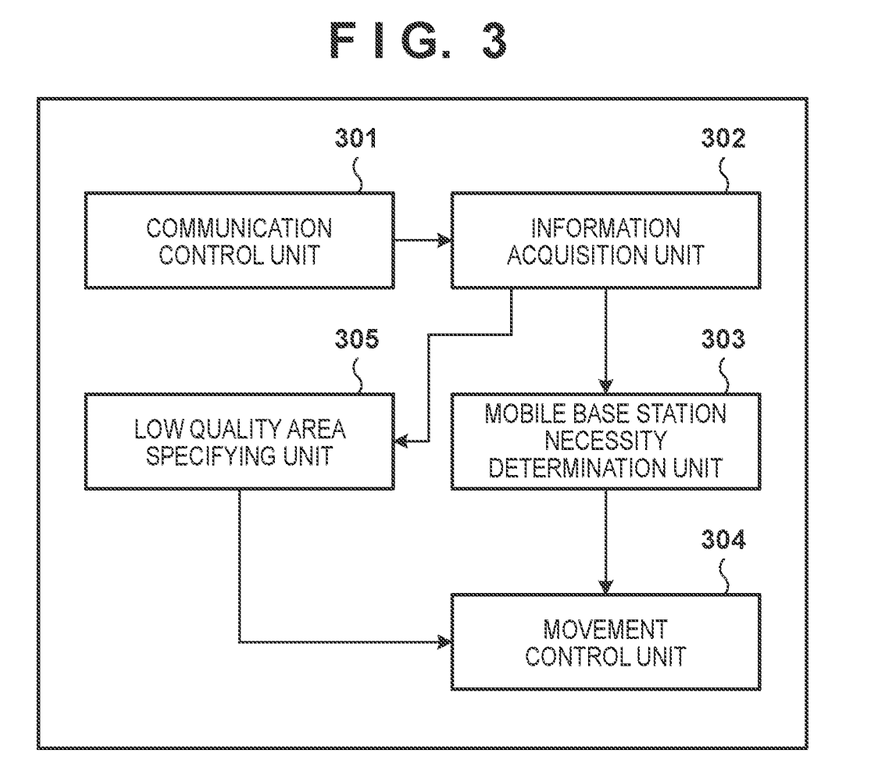
FIG. 3 is a diagram illustrating an example of a functional configuration of the control device.

FIG. 3 illustrates an example of a functional configuration of the control device 141 of the present embodiment. The control device 141 includes, for example, a communication control unit 301, an information acquisition unit 302, a mobile base station necessity determination unit 303, a movement control unit 304, and a low quality area specifying unit 305 as the functional configuration thereof. Note that these functions are not essential, and some functions may be omitted or may be replaced with other functions. In addition, two or more functions may be integrated into one, or one function may be divided into two or more functions.

The communication control unit 301 controls communication with a device outside the control device 141 or a device including the control device 141. For example, the communication control unit 301 performs a control for performing communication with a base station or a network node of the cellular communication system. Furthermore, in a case where the control device 141 is included in the base station or the network node, a control for performing communication with a terminal device can be performed. Furthermore, for example, in a case where a remote control for a mobile base station is performed, the communication control unit 301 can perform communication with the mobile base station based on, for example, the cellular communication system.

The information acquisition unit 302 acquires information on the communication quality, for example, from a base station that performs the predetermined type of communication or from a network node that collects and/or manages the communication quality of such a base station. The information acquisition unit 302 can acquire, as the information on the communication quality, for example, information on a communication quality predicted based on past communication of each of one or more base stations that perform the predetermined type of communication. Furthermore, the information acquisition unit 302 can acquire, from a base station capable of executing the predetermined type of communication or a network node managing the base station, information indicating whether or not the base station is currently performing the predetermined type of communication. Accordingly, the mobile base station necessity determination unit 303 to be described later can determine whether or not the communication quality of the base station that is currently performing the predetermined type of communication is sufficient. Here, the information acquisition unit 302 may acquire information indicating the communication quality of each of a plurality of types of communication and information indicating a type corresponding to the communication quality. The information acquisition unit 302 may acquire a position where the predetermined type of communication is performed and information on the communication quality of the communication. In an example, the information acquisition unit 302 can acquire, for each base station, information on the communication quality (predicted communication quality) at each position in a cell formed by each base station and information on a position of a terminal device that is performing the predetermined type of communication. According to these pieces of information, it is possible to estimate the communication quality obtained by the communication of the terminal device that is performing the predetermined type of communication. Furthermore, the information acquisition unit 302 may acquire information indicating the current communication quality (and the position of the terminal device as necessary) of each of one or more terminal devices that are performing the predetermined type of communication. The communication quality is, for example, SNR, SINR, RSRP, RSRQ, a delay in communication, the number of terminal devices in communication (the degree of congestion), the use rate of radio resources, or the like of communication of a base station that is performing the predetermined type of communication, and one or more of them can be acquired by the information acquisition unit 302. Furthermore, the information acquisition unit 302 may acquire quality information by acquiring a sample value of the communication quality and calculating a value indicating the communication quality to be actually used, such as a statistical value.

The mobile base station necessity determination unit 303 determines whether or not it is necessary to cause the mobile base station to provide the wireless communication service based on the information acquired by the information acquisition unit 302. For example, in a case where the communication quality of the base station that is performing the predetermined type of communication is lower than the predetermined communication quality, the mobile base station necessity determination unit 303 determines to move the mobile base station to a position associated with the base station. Meanwhile, even when there is a base station that is performing the predetermined type of communication, in a case where the communication quality is not lower than the predetermined communication quality, the mobile base station necessity determination unit 303 determines not to move the mobile base station to a position associated with the base station. For example, in a case where the communication quality of the predetermined type of communication of a base station that is performing the predetermined type of communication and another type of communication is not lower than the predetermined communication quality, the mobile base station necessity determination unit 303 can determine not to move the mobile base station to a position associated with the base station even when the communication quality of the another type of communication is lower than the predetermined communication quality. On the other hand, in a case where the communication quality of the predetermined type of communication of a certain base station is lower than the predetermined communication quality, the mobile base station necessity determination unit 303 can determine to move the mobile base station to a position associated with the base station even when the communication quality of another type of communication is not lower than the predetermined communication quality.

Note that, in the above example, an example in which the mobile base station necessity determination unit 303 determines whether or not the communication quality of a certain base station is lower than the predetermined communication quality in order to determine whether or not to move the mobile base station to a position associated with a certain base station has been described, but the present invention is not limited thereto. For example, the information acquisition unit 302 may acquire information indicating whether or not the communication quality of the predetermined type of communication of each base station is lower than the predetermined communication quality from each base station or a network node that manages the information. In this case, the mobile base station necessity determination unit 303 specifies a base station whose communication quality of the predetermined type of communication is lower than the predetermined communication quality, and determines to move the mobile base station to a position associated with the base station.

The movement control unit 304 performs a control for moving the mobile base station to a position associated with a base station to which the mobile base station is determined to be headed by the mobile base station necessity determination unit 303. This control may be, for example, a control for outputting, to the outside, information indicating the position associated with the base station to which the mobile base station is to be headed. That is, the control device 141 is, for example, a device used for an information providing service to a network operator, and can perform a control for presenting information indicating a position to which the mobile base station is to be moved to the network operator. Furthermore, this control may be a control for setting a destination of the mobile base station in a case where the mobile base station is an automated driving vehicle, or a remote driving vehicle, or an automatic flight vehicle that can automatically move, for example. Furthermore, this control may be, for example, a control for presenting information indicating a position associated with a base station to which the mobile base station is to be moved, to the user of the control device 141 via the input/output circuit 205. In this case, the user may manually set the presented position for the mobile base station. That is, in the control here, various processing can be executed as long as the control is used to move the mobile base station to a position where the wireless communication service for an area in which it is specified that the communication quality is insufficient can be provided. Note that the position associated with the base station may be a position around the base station, such as a position immediately below the base station, or may be a predetermined position, for example, near an edge of a cell formed by the base station.

For example, in a case where the information acquired by the information acquisition unit 302 indicates a relationship between a position of a terminal device that is performing the predetermined type of communication with a certain base station and the communication quality, the low quality area specifying unit 305 specifies an area in which the communication quality in a cell formed by the base station is insufficient. For example, in a case where the communication quality is lower than the predetermined communication quality at the position of the terminal device that is performing the predetermined type of communication, the low quality area specifying unit 305 specifies an area including the position as the area in which the communication quality is insufficient. In addition, for example, based on information indicating the position of the terminal device that is performing the predetermined type of communication, in a case where the number of such terminal devices exceeds a predetermined number in an area having a predetermined size set in advance, the low quality area specifying unit 305 specifies the area as the area in which the communication quality is insufficient. Note that these methods of specifying the area in which the communication quality is insufficient is an example, and an area in which the communication quality is insufficient may be specified by a method other than these methods. Once the area in which the communication quality is insufficient is specified, the low quality area specifying unit 305 specifies a position where the wireless communication service can be provided for at least a part of the area. This position can be, for example, a position within the specified area, and may be a position outside the specified area. The low quality area specifying unit 305 notifies the movement control unit 304 of the specified position.

Once the position is not notified from the low quality area specifying unit 305, the movement control unit 304 can perform a control for moving the mobile base station to the position. In addition, in a case where the position is not notified from the low quality area specifying unit 305, the movement control unit 304 can move the mobile base station to a prescribed position such as the periphery of the base station or the edge of the cell as described above. That is, in a case where the low quality area specifying unit 305 specifies that the communication quality is insufficient in a specific area, the movement control unit 304 can perform a control to move the mobile base station in order to improve the communication quality in the area, and in a case where the communication quality is insufficient over the entire cell or in a case where an area in which the communication quality is insufficient is not specified, the movement control unit 304 can perform a control to move the mobile base station to a preset position.

(Flow of Processing)

Figure 4:
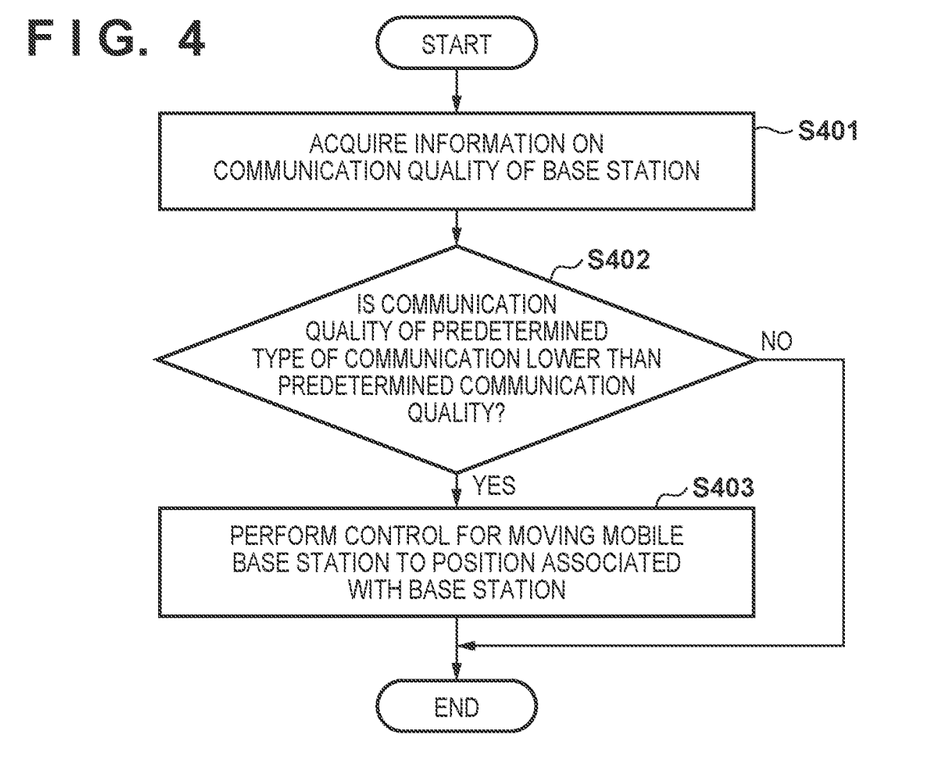
FIG. 4 is a diagram illustrating an example of a flow of processing executed by the control device.
Figure 5:
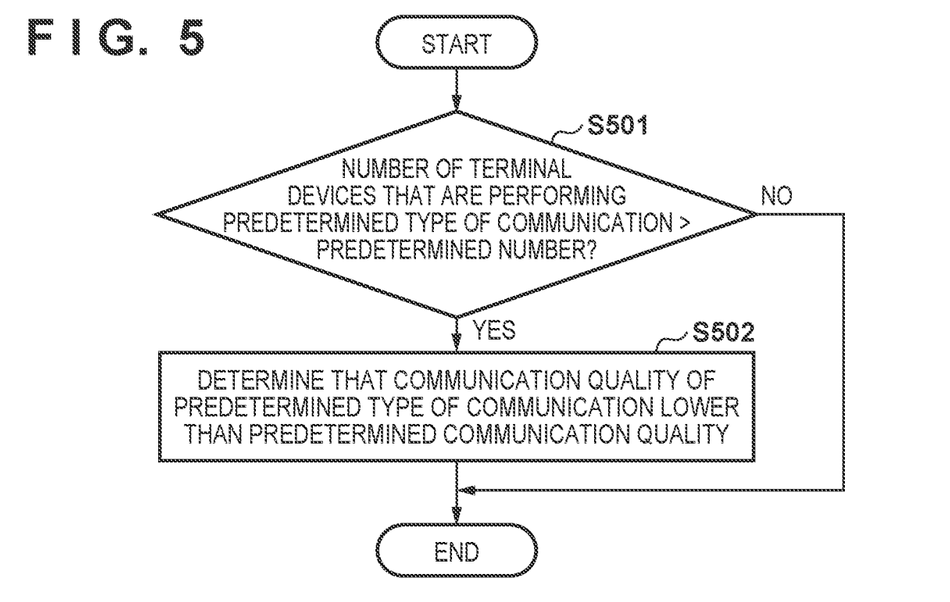
FIG. 5 is a diagram illustrating an example of a flow of processing executed by the control device.
Figure 6:
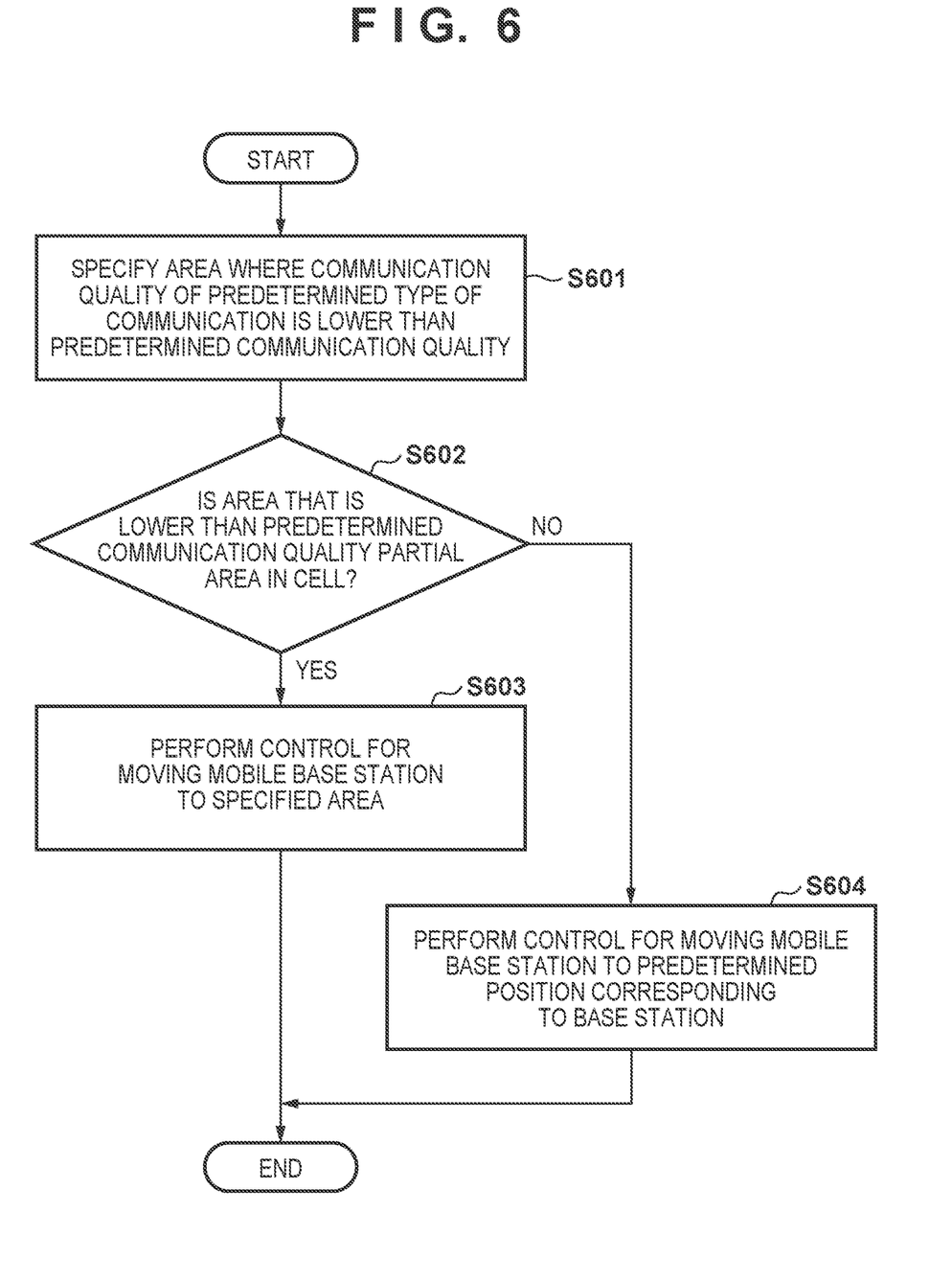
FIG. 6 is a diagram illustrating an example of a flow of processing executed by the control device.

Next, an example of a flow of processing executed by the control device 141 will be described with reference to FIGS. 4 to 6. In an example, the CPU 201 of the control device 141 executes a program stored in the memory 202 to perform this processing. Furthermore, in the control device 141, this processing can be started by the user instructing the start of the processing, but this processing may be always executed while the control device 141 is in operation. Note that an overlapping description of the details described above is omitted below.

First, the control device 141 acquires information on the communication quality from each base station or from a network node that manages information on a plurality of base stations (S401). Here, the control device 141 acquires information on a communication quality of a base station that performs at least the predetermined type of communication. For example, the control device 141 can acquire information indicating whether or not a base station capable of performing the predetermined type of communication is actually performing the predetermined type of communication, and information on the communication quality of the base station. Furthermore, the control device 141 may acquire information on a communication quality of a type of communication different from the predetermined type of communication. In addition, the control device 141 may acquire information on a correspondence relationship between a position in a cell formed by each base station and a communication quality corresponding to the position. Furthermore, the control device 141 may acquire, for example, information that specifies a position of a terminal device that is performing the predetermined type of communication as the information on the communication quality.

Thereafter, the control device 141 determines whether or not the communication quality of the predetermined type of communication of each base station is lower than the predetermined communication quality based on the acquired information on the communication quality (S402). This determination can be performed by comparing the communication quality of the predetermined type of communication with the predetermined communication quality. In addition, whether or not the communication quality is lower than the predetermined communication quality may be determined according to the number of terminal devices performing the predetermined type of communication. The flow of this processing is illustrated in FIG. 5. In the example of FIG. 5, it is assumed that the control device 141 acquires information (for example, the number of terminal devices, the position of the terminal device, and information specifying the terminal device) of a terminal device that is performing the predetermined type of communication for each base station. Based on this information, the control device 141 determines whether or not the number of terminal devices that are performing the predetermined type of communication and are subordinate to a certain base station exceeds a predetermined number (S501). Note that the terminal device subordinate to the certain base station is a terminal device that is performing communication with the base station, but it is not necessary to perform the predetermined type of communication with the base station, and the subordinate terminal device may perform communication with another device such as another terminal device subordinate to the same base station. In a case where it is determined that the number of terminal devices performing the predetermined type of communication exceeds the predetermined number (YES in S501), the control device 141 determines that the communication quality of the predetermined type of communication of the base station to which the terminal device is connected is lower than the predetermined communication quality (S502). On the other hand, in a case where it is determined that the number of terminal devices that are performing the predetermined type of communication does not exceed the predetermined number (NO in S501), the control device 141 ends the processing of FIG. 5. Note that, even in a case where the number of terminal devices performing the predetermined type of communication with the certain base station is less than the predetermined number, it is determined whether or not the communication quality such as SNR is lower than the predetermined communication quality for the base station. That is, the control device 141 can determine whether or not the communication quality of the predetermined type of communication of each base station is lower than the predetermined communication quality according to a plurality of criteria. In addition, whether or not the communication quality of the predetermined type of communication of each base station is lower than the predetermined communication quality may be determined by each base station or the network node, and the control device 141 may acquire information on the determination result.

Returning to FIG. 4, in a case where it is determined that the communication quality of the predetermined type of communication of the certain base station is lower than the predetermined communication quality (YES in S402), the control device 141 performs a control for moving the mobile base station to a position associated with the base station (S403). Note that, in S403, the control device 141 may move the mobile base station to a position set in advance for each base station, or may further execute processing of determining a position to which the mobile base station is to be moved. This processing will be described with reference to FIG. 6. In the processing of FIG. 6, first, the control device 141 specifies an area where the communication quality of the predetermined type of communication is lower than the predetermined communication quality (S601). Then, for a certain base station, the control device 141 determines whether or not an area where the communication quality of the predetermined type of communication is lower than the predetermined communication quality is maldistributed in a partial region of a cell formed by the base station (S602). The control device 141 may perform this determination based on, for example, information on the communication quality of the predetermined type of communication for each position in a cell formed by each base station. Furthermore, the control device 141 can determine whether or not the terminal devices that are performing the predetermined type of communication are maldistributed in a partial area based on, for example, the distribution of the positions of the terminal devices that are performing the predetermined type of communication in the cell formed by each base station. Note that, for example, in a case where a ratio of the size of the area where the communication quality is lower than the predetermined communication quality to the size of the entire cell is smaller than a predetermined value, the control device 141 can determine that the area is maldistributed in a partial area (YES in S602). On the other hand, in a case where the ratio of the size of the area where the communication quality is lower than the predetermined communication quality to the size of the entire cell exceeds the predetermined value, the control device 141 can determine that the communication quality in the cell is entirely insufficient (NO in S602). In a case where it is determined that the area where the communication quality of the predetermined type of communication is lower than the predetermined communication quality is maldistributed in a part of the cell (YES in S602), the control device 141 performs a control for moving the mobile base station to a position where the communication quality in the area can be improved (S603). On the other hand, in a case where it is determined that the communication quality in the cell is entirely insufficient (NO in S602), the control device 141 can perform a control to move the mobile base station to a predetermined position such as the periphery of the base station or the edge of the cell.

Note that, in the above-described example, the processing in a case where the mobile base station is used to improve the communication quality of the predetermined type of communication and the mobile base station is not used to improve the communication quality of other types of communication has been described. However, the present invention is not limited thereto. For example, the value of the predetermined communication quality described above may be set for each type of communication. For example, a first predetermined communication quality for the predetermined type of communication may be set to a value indicating a high quality, and a second predetermined communication quality for other types of communication may be set to a value below which communication is disabled. Note that a different predetermined communication quality may be set for each of three or more types of communication. With this configuration, for the quality of the predetermined type of communication, the mobile base station can be preferentially used even in a situation where the communication quality is relatively high. For the quality of the other types of communication, the mobile base station can be used only in a situation where the communication quality is extremely deteriorated.

According to such processing, for example, the communication quality of the predetermined type of communication that needs to maintain a high communication quality can be improved by using the mobile base station. At this time, for example, it is possible to prevent occurrence of a situation where the number of mobile base stations that can be used for improving the communication quality of the above-described predetermined type of communication is insufficient due to the use of the mobile base station for a type of communication that only requires a relatively low communication quality. As a result, it is possible to improve the communication quality by efficiently using the mobile base station over the entire system.

SUMMARY OF EMBODIMENT

1. A control device of the embodiment includes:
an acquisition unit configured to acquire information regarding a communication quality of a base station that performs a predetermined type of communication; and
a control unit configured to perform a control for moving a mobile base station to a position associated with the base station in a case where it is determined that the communication quality is lower than a predetermined communication quality.

According to this embodiment, for example, a communication quality of some types of communication for which a high communication quality needs to be maintained can be selectively improved by using the mobile base station. As a result, it is possible to efficiently improve the communication quality of the entire system by using a finite number of mobile base stations.

2. In the control device of the embodiment according to 1, in a case where the base station performs another type of communication different from the predetermined type of communication, and it is determined that the communication quality of the predetermined type of communication is not lower than the predetermined communication quality, the control unit does not move the mobile base station to the position even in a case where it is determined that a communication quality of the another type of communication is lower than the predetermined communication quality.

According to this embodiment, as the mobile base station is preferentially used for the predetermined type of communication to improve the communication quality, it is possible to efficiently move the mobile base station according to the type of communication. Furthermore, by lowering the priority of improvement of the communication quality using the mobile base station for a type of communication other than the predetermined type of communication, it is possible to prevent excessive improvement of the communication quality for communication that actually only requires a low communication quality.

3. The control device of the embodiment according to 1 or 2, further includes a determination unit configured to determine whether or not the communication quality of the predetermined type of communication is lower than the predetermined communication quality.

According to this embodiment, the control device can perform a flexible control such as flexible setting of the predetermined communication quality by performing the determination of the communication quality in the control device itself.

4. In the control device of the embodiment according to 3, in a case where the number of terminal devices that perform the predetermined type of communication with the base station exceeds a predetermined number, the determination unit determines that the communication quality of the predetermined type of communication is lower than the predetermined communication quality.

According to this embodiment, it is possible to detect deterioration in communication quality due to a decrease in the number of communication resources that can be allocated to the terminal devices, which results from a large number of terminal devices that perform the predetermined type of communication, at an early stage and perform a control for improving the communication quality.

5. In the control device of the embodiment according to 3 or 4, in a case where an area where the communication quality of the predetermined type of communication is predicted to be lower than the predetermined communication quality is included in a cell formed by the base station, the determination unit determines that the communication quality of the predetermined type of communication is lower than the predetermined communication quality.

According to this embodiment, even when the communication quality is favorable in the entire range of a cell formed by each base station, in a case where an area where the communication quality is predicted to be low is included in the cell, the processing of improving the communication quality can be executed. For example, in a case where it is determined that the communication quality is low only in a partial area as terminal devices that perform the predetermined type of communication are concentrated in a partial area, for example, terminal devices for a remote driving control are maldistributed in a part of a road for the exclusive use of motor vehicles, the processing of improving the communication quality can be executed.

6. In the control device of the embodiment according to 5, the position associated with the base station is a position at which a wireless communication service is providable for at least a part of the area.

According to this embodiment, in a case where the communication quality is deteriorated in a partial area, it is possible to intensively improve the communication quality in the area.

7. In the control device of the embodiment according to any one of 1 to 5, the position associated with the base station is a position where the base station is installed.

According to this embodiment, by moving the mobile base station to the position where the base station is installed, the capacity of the base station can be virtually increased. Therefore, it is possible to improve the communication quality of the entire cell formed by the base station.

8. In the control device of the embodiment according to any one of 1 to 7, the predetermined type of communication includes communication for controlling remote driving or automated driving of a vehicle.

According to this embodiment, since a communication quality of the communication for controlling the remote driving or automated driving of the vehicle is improved by the mobile base station, it is possible to control the vehicle with high accuracy.

9. In the control device of the embodiment according to any one of 1 to 7, the predetermined type of communication includes communication of a next-generation in-vehicle infotainment system.

According to this embodiment, a communication service by the infotainment system in the vehicle can be used in a highly functional and highly accurate state.

10. In the control device of the embodiment according to any one of 1 to 9, the mobile base station is an automated driving vehicle having a base station function.

According to this embodiment, the mobile base station can automatically move to the vicinity of the area where the communication quality is to be improved and autonomously provide the wireless communication service.

11. In the control device of the embodiment according to any one of 1 to 9, the mobile base station is an automatic flight vehicle having a base station function.

According to this embodiment, the mobile base station can automatically move to the vicinity of the area where the communication quality is to be improved and autonomously provide the wireless communication service.

12. A control method of the embodiment is executed by a control device, the control method includes:
acquiring information regarding a communication quality of a base station that performs a predetermined type of communication; and
performing a control for moving a mobile base station to a position associated with the base station in a case where it is determined that the communication quality is lower than a predetermined communication quality.

According to this embodiment, for example, a communication quality of some types of communication for which a high communication quality needs to be maintained can be selectively improved by using the mobile base station. As a result, it is possible to efficiently improve the communication quality of the entire system by using a finite number of mobile base stations.

13. A program of the embodiment causes a computer included in a control device to execute:
acquiring information regarding a communication quality of a base station that performs a predetermined type of communication; and
performing a control for moving a mobile base station to a position associated with the base station in a case where it is determined that the communication quality is lower than a predetermined communication quality.

According to this embodiment, for example, a communication quality of some types of communication for which a high communication quality needs to be maintained can be selectively improved by using the mobile base station. As a result, it is possible to efficiently improve the communication quality of the entire system by using a finite number of mobile base stations.

According to the present invention, it is possible to efficiently improve a communication quality in an area where the communication quality is insufficient.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A control device comprising:
at least one processor; and
at least one memory that stores a computer-readable instruction that, when executed by the at least one processor, causes the at least one processor to:
acquire information regarding a first communication quality of a predetermined type of communication in a base station that performs the predetermined type of communication and another type of communication that is different from the predetermined type of communication; and
perform, in a case where it is determined that the first communication quality is lower than a predetermined communication quality, a control for moving a mobile base station to a position associated with the base station even in a case where it is determined that a second communication quality of the another type of communication in the base station is lower than the predetermined communication quality,
wherein in a case where it is determined that the first communication quality of the predetermined type of communication is not lower than the predetermined communication quality, the mobile base station is not moved to the position even in a case where it is determined that the second communication quality of the another type of communication is lower than the predetermined communication quality.

2. The control device according to claim 1, wherein the computer-readable instruction causes, when executed by the at least one processor, the at least one processor to determine whether or not the first communication quality of the predetermined type of communication is lower than the predetermined communication quality.

3. The control device according to claim 2, wherein in a case where the number of terminal devices that perform the predetermined type of communication with the base station exceeds a predetermined number, the first communication quality of the predetermined type of communication is determined to be lower than the predetermined communication quality.

4. The control device according to claim 2, wherein in a case where an area where the first communication quality of the predetermined type of communication is predicted to be lower than the predetermined communication quality is included in a cell formed by the base station, the first communication quality of the predetermined type of communication is determined to be lower than the predetermined communication quality.

5. The control device according to claim 4, wherein the position associated with the base station is a position at which a wireless communication service is providable for at least a part of the area.

6. The control device according to claim 1, wherein the position associated with the base station is a position where the base station is installed.

7. The control device according to claim 1, wherein the predetermined type of communication includes communication for controlling remote driving or automated driving of a vehicle.

8. The control device according to claim 1, wherein the mobile base station is an automated driving vehicle having a base station function.

9. The control device according to claim 1, wherein the mobile base station is an automatic flight vehicle having a base station function.

10. A control method executed by a control device, the control method comprising:
acquiring information regarding a first communication quality of a predetermined type of communication in a base station that performs the predetermined type of communication and another type of communication that is different from the predetermined type of communication; and
performing, in a case where it is determined that the first communication quality is lower than a predetermined communication quality, a control for moving a mobile base station to a position associated with the base station even in a case where it is determined that a second communication quality of the another type of communication in the base station is lower than the predetermined communication quality, and
wherein in a case where it is determined that the first communication quality of the predetermined type of communication is not lower than the predetermined communication quality, the mobile base station is not moved to the position even in a case where it is determined that the second communication quality of the another type of communication is lower than the predetermined communication quality.

11. A non-transitory computer-readable storage medium that stores a program for causing a computer included in a control device to execute:
acquiring information regarding a first communication quality of a predetermined type of communication in a base station that performs the predetermined type of communication and another type of communication that is different from the predetermined type of communication; and
performing, in a case where it is determined that the first communication quality is lower than a predetermined communication quality, a control for moving a mobile base station to a position associated with the base station even in a case where it is determined that a second communication quality of the another type of communication in the base station is lower than the predetermined communication quality, and
wherein in a case where it is determined that the first communication quality of the predetermined type of communication is not lower than the predetermined communication quality, the mobile base station is not moved to the position even in a case where it is determined that the second communication quality of the another type of communication is lower than the predetermined communication quality.

* * * * *